US009779062B2

(12) United States Patent
Ito et al.

(10) Patent No.: US 9,779,062 B2
(45) Date of Patent: Oct. 3, 2017

(54) APPARATUS, METHOD, AND COMPUTER PROGRAM PRODUCT FOR COMPUTING OCCURRENCE PROBABILITY OF VECTOR

(71) Applicant: Kabushiki Kaisha Toshiba, Minato-ku, Tokyo (JP)

(72) Inventors: Satoshi Ito, Kawasaki Kanagawa (JP); Susumu Kubota, Meguro Tokyo (JP); Tomohiro Nakai, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 111 days.

(21) Appl. No.: 14/937,566

(22) Filed: Nov. 10, 2015

(65) Prior Publication Data

US 2016/0132463 A1 May 12, 2016

(30) Foreign Application Priority Data

Nov. 12, 2014 (JP) .................................. 2014-230215

(51) Int. Cl.
*G06F 1/02* (2006.01)
*G06F 17/18* (2006.01)
*G06F 17/16* (2006.01)

(52) U.S. Cl.
CPC .............. *G06F 17/18* (2013.01); *G06F 17/16* (2013.01)

(58) Field of Classification Search
CPC ..... G06F 17/18; G06F 17/30271; G06F 17/16
(Continued)

(56) References Cited

U.S. PATENT DOCUMENTS 5,841,679 A * 11/1998 Miura .................... G06F 17/10
340/146.2
7,054,468 B2 5/2006 Yang
(Continued)

FOREIGN PATENT DOCUMENTS

JP 04175885 A * 6/1992
JP 2005-512201 A 4/2005
(Continued)

OTHER PUBLICATIONS

Extended European Search Report dated May 20, 2016 of European Patent Application No. 15193945.1—6 pages.
(Continued)

*Primary Examiner* — Tan V. Mai
(74) *Attorney, Agent, or Firm* — Knobbe, Martens, Olson & Bear, LLP (57) ABSTRACT

According to an embodiment, a computing apparatus includes a memory, and a processor. The memory stores N first vectors in a d-dimensional binary vector space consisting of binary values. The processor acquires a second vector in the d-dimensional binary vector space. The processor extracts M first vectors having a distance from the second vector satisfying a first condition out of the N first vectors, and calculate a distribution of distances of the M first vectors from the second vector. The processor acquires a first kernel function per a first distance between the M first vectors and the second vector in a first range. The processor generates a second kernel function based on the distribution and the first kernel functions. The processor calculates an occurrence probability of the second vector in the N first vectors based on the second kernel function.

20 Claims, 6 Drawing Sheets (58) Field of Classification Search
USPC .................................. 382/159, 170; 708/270
See application file for complete search history.

(56) References Cited

U.S. PATENT DOCUMENTS

| | | | |
|---|---|---|---|
| 7,162,085 B2* | 1/2007 | Kato | G06K 9/6232 382/181 |
| 8,014,601 B2 | 9/2011 | Takahashi | |
| 2004/0243636 A1* | 12/2004 | Hasiewicz | G05B 23/0251 |
| 2006/0274918 A1* | 12/2006 | Amantea | G06K 9/6253 382/117 |
| 2008/0253665 A1* | 10/2008 | Mitarai | G06K 9/6252 382/227 |
| 2010/0283861 A1* | 11/2010 | Tamagawa | G06T 5/007 348/222.1 |
| 2012/0243779 A1* | 9/2012 | Nakai | G06K 9/6256 382/159 |
| 2013/0262489 A1 | 10/2013 | Shirakawa | |
| 2014/0177950 A1 | 6/2014 | Nakai et al. | |

FOREIGN PATENT DOCUMENTS

| | | |
|---|---|---|
| JP | 2013-206187 A | 10/2013 |
| JP | 2014-123184 A | 7/2014 |
| WO | WO 2007/063705 A1 | 6/2007 |

OTHER PUBLICATIONS

Li et al., "Nonparametric Estimation of Distributions with Categorical and Continuous Data", Journal of Multivariate Analysis vol. 86 (2003), pp. 266-292—27 pages.

D. Qin, et al., "Query Adaptive Similarity for Large Scale Object Retrieval," Computer Vision and Pattern Recognition (CVPR), 2013.

J. Aitchison, et al., "Multivariate binary discrimination by the kernel method," Biometrika, 63, 3, pp. 413-420, 1976.

\* cited by examiner

APPARATUS, METHOD, AND COMPUTER PROGRAM PRODUCT FOR COMPUTING OCCURRENCE PROBABILITY OF VECTOR

CROSS-REFERENCE TO RELATED APPLICATION

This application is based upon and claims the benefit of priority from Japanese Patent Application No. 2014-230215, filed on Nov. 12, 2014; the entire contents of which are incorporated herein by reference.

FIELD

Embodiments described herein relate generally to a computing apparatus, a computing method, and a computer program product.

BACKGROUND

A method of kernel smoothing has been known to be used for calculating (estimating) the occurrence probability of an arbitrary vector in a d-dimensional (d is an integer equal to or larger than 1) Euclidean space using a plurality of training vectors existing in the Euclidean space. The training vectors or an arbitrary vector have components of points in the Euclidean space (d-dimensional coordinates), which correspond to points in the Euclidean space.

In the above-described method, as indicated in Equation (1), a kernel function K is used to calculate occurrence probabilities $K(x, x_i)$ of an arbitrary vector x relative to a certain number N (N is an integer equal to or larger than 2) of training vectors $x_i$. The total of a plurality of resulting occurrence probabilities $K(x, x_i)$ is obtained and in turn divided by N, whereby the occurrence probability P(x) of the arbitrary vector x relative to the number N of training vectors is calculated.

$$P(x) = \frac{1}{N}\sum_{i=1}^{N} K(x, x_i) \quad (1)$$

The occurrence probabilities $K(x, x_i)$ of an arbitrary vector x relative to the training vectors $x_i$ are calculated based on the distance between the training vectors $x_i$ and the arbitrary vector x. The kernel function K actually used here, therefore, represents a function of the distance between two vectors like homoscedastic Gaussians. The kernel function K has a fixed degree of smoothing.

However, typical training vectors are distributed with some deviation rather than being distributed uniformly in the Euclidean space. An example is disclosed in D. Qin and C. Wengert and L. v. Gool, "Query Adaptive Similarity for Large Scale Object Retrieval", Computer Vision and Pattern Recognition (CVPR), 2013. This documents describes a technique for achieving increased accuracy of calculation on the occurrence probability P(x) of an arbitrary vector x, by which the degree of smoothing is adaptively controlled using the distribution of a certain number N of training vectors $x_i$ (specifically, the distribution of the distance of the number N of training vectors $x_i$ relative to the arbitrary vector x).

In the above-described technique, however, the Euclidean space is assumed rather than a binary space.

The Euclidean space is a d-dimensional space in which values in the respective dimensions are represented with sequential values (continuous values). The values of components in d dimensions indicating points in the space (coordinates) are also represented with continuous values. By contrast, the binary space is a d-dimensional space in which values in the respective dimensions are represented in binary, which is either 0 or 1, that is, non-continuous value. The value of each component (coordinate) in the d dimensions indicating points in the binary space is also represented in binary, which is either 0 or 1, that is, non-continuous value.

The difference between the Euclidean space and the binary space disables the above-described technique to directly achieve highly accurate calculation on the occurrence probability of an arbitrary vector in the binary space using a plurality of training vectors existing in the binary space.

DETAILED DESCRIPTION

According to an embodiment, a computing apparatus includes a memory, and a processor. The memory configured to store N first vectors in a d-dimensional binary vector space consisting of binary values (0 or 1), wherein each of the N first vectors is represented by d binary elements, wherein N is an integer equal to or larger than 2, and d is an integer equal to or larger than 1. The processor configured to acquire a second vector in the d-dimensional binary vector space, the second vector represented by d binary elements. The processor configured to extract M first vectors having a distance from the second vector satisfying a first condition out of the N first vectors, and calculate a distribution of distances of the M first vectors from the second vector, wherein M is an integer, larger than zero, and smaller than N. The processor configured to acquire a first kernel function per a first distance between the M first vectors and the second vector in a first range. The processor configured to generate a second kernel function based on the distribution and the first kernel functions. The processor configured to calculate an occurrence probability of the second vector in the N first vectors based on the second kernel function.

Embodiments will be hereinafter described in detail with reference to the accompanying drawings.

First embodiment

Firstly described is the reason why the conventional technique disclosed in D. Qin and C. Wengert and L. v. Gool, "Query Adaptive Similarity for Large Scale Object Retrieval", Computer Vision and Pattern Recognition (CVPR), 2013, fails to directly achieve highly accurate calculation on the occurrence probability of an arbitrary vector in a binary space. As described above, the binary space is a d-dimensional space (d is an integer equal to or larger than 1) in which values in the respective dimensions are represented in binary, with either 0 or 1, that is, with non-continuous values. The values of components in the d dimensions indicating points in the space (coordinates) are also represented in binary, with either 0 or 1, that is, with non-continuous values.

A vector in the binary space has components the values of which in the d dimensions are represented in binary, with either 0 or 1. If a vector $b_1$, which is a training vector in the binary space, serves as a reference, the occurrence probability of a vector $b_2$, which is an arbitrary vector in the binary space, can be expressed by Equation (2), where the probabilities of the components of the vector $b_2$ differing from the respective components of the vector $b_1$ are represented with p. The probabilities p are constant regardless of the components and independent from each other.

$$P(b_2|b_1)=p^h(1-p)^{d-h} \qquad (2)$$

where h is the Hamming distance between the vectors $b_1$ and $b_2$. In Equation (2), if the value of h increases, the occurrence probability of the vector $b_2$ approaches 0 in an increased speed with a smaller probability p. That is, if Equation (2) is a kernel function, the degree of smoothing decreases with a smaller probability p.

Figure 1:
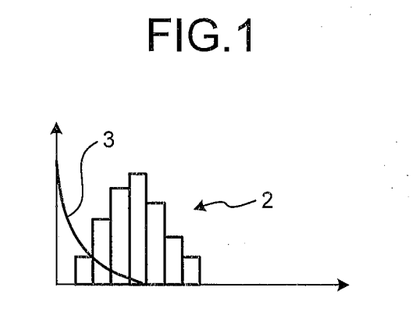
FIG. 1 is a diagram illustrating control of the degree of smoothing of a kernel function according to a first embodiment.

When calculating the occurrence probability of the vector $b_2$ relative to a plurality of training vectors in the binary space, therefore, as illustrated in the histogram 2 of the distance of a vector $b_2$ relative to the training vectors in FIG. 1, using a smaller probability p with a shorter distance between the vector $b_2$ and the training vectors decreases the degree of smoothing of a kernel function 3.

Figure 2:
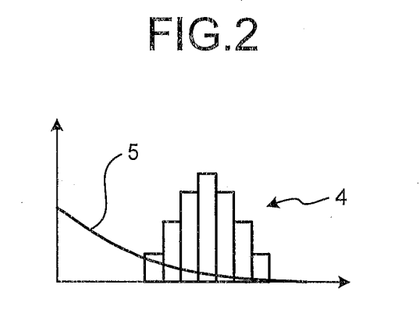
FIG. 2 is a diagram illustrating control of the degree of smoothing of a kernel function according to the first embodiment.

By contrast, as illustrated in the histogram 4 of the distance of the vector $b_2$ relative to a plurality of training vectors in FIG. 2, using a larger probability p with a longer distance between the vector $b_2$ and the training vectors increases the degree of smoothing of a kernel function 5.

However, as illustrated in FIGS. 1 and 2, the shape of the function changes as the value of the probability p changes in Equation (2). That is, if Equation (2) is a kernel function, controlling the degree of smoothing inevitably changes the kernel function.

As described above, if the degree of smoothing is controlled to calculate the occurrence probability of an arbitrary vector in the binary space, a kernel function corresponding to the degree of smoothing is necessary. By contrast, in the conventional technique in the above-described document, a single kernel function can be used for different degrees of smoothing; therefore, the technique disclosed in the document fails to directly achieve highly accurate calculation on the occurrence probability.

The following describes a method for highly accurately calculating the occurrence probability of an arbitrary vector in the binary space.

Figure 3:
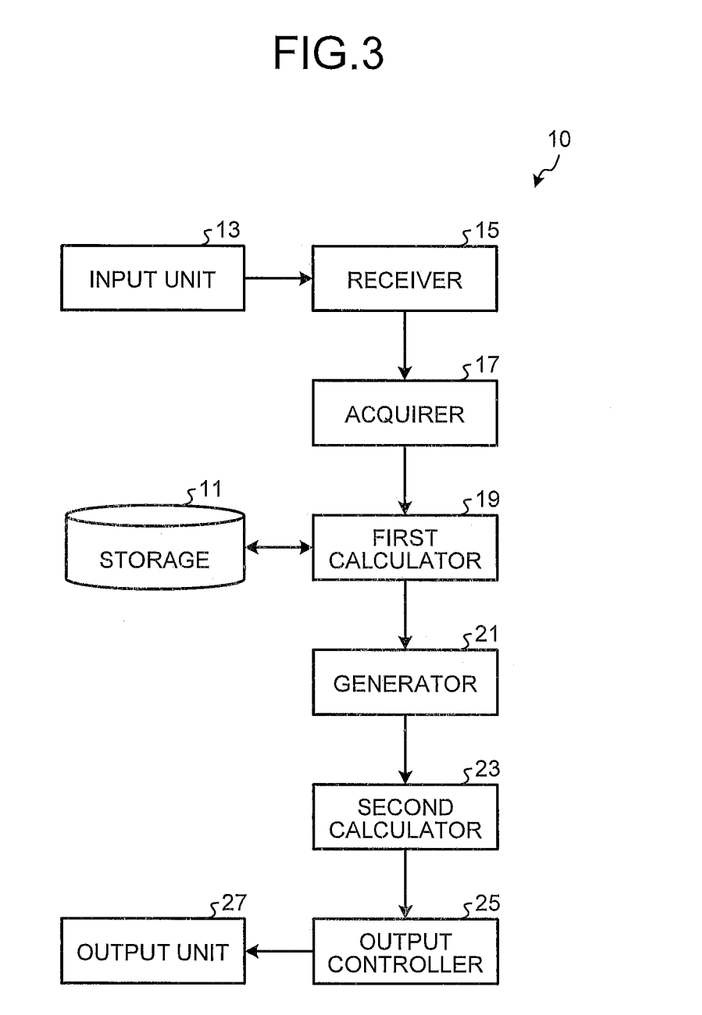
FIG. 3 is a configuration diagram illustrating a computing apparatus according to the first embodiment.

FIG. 3 is a configuration diagram illustrating a computing apparatus 10 according to the first embodiment. As illustrated in FIG. 3, the computing apparatus 10 includes a storage 11, an input unit 13, a receiver 15, an acquirer 17, a first calculator 19, a generator 21, a second calculator 23, an output controller 25, and an output unit 27.

The storage 11 can be achieved with at least one of storage devices capable of magnetic, optical, or electrical storage, such as a hard disk drive (HDD), a solid state drive (SSD), a memory card, an optical disc, a random access memory (RAM), and a read only memory (ROM).

The input unit 13 is used for inputting target data to be processed and can be achieved with an imaging device such as a camera, a communication device such as a network interface, or an auxiliary storage device such as an HDD and an SSD.

The receiver 15, the acquirer 17, the first calculator 19, the generator 21, the second calculator 23, and the output controller 25 can be achieved by enabling, for example, a processor such as a central processing unit (CPU) to execute a computer program, that is, achieved with software. Alternatively, they can be achieved with hardware such as an integrated circuit (IC), or with a combination of software and hardware.

The output unit 27 can be achieved with a display device such as a liquid crystal display and a touch panel display.

The storage 11 stores therein a certain number N (N is an integer equal to or larger than 2) of first vectors $b_1$ ($b_1$ e B) that are training vectors existing in a d-dimensional binary space B in which values in the respective dimensions are represented in binary, with either 0 or 1. The first vectors $b_1$ ($b_1 \in B$) each have a certain number d of components that are represented in binary, with either 0 or 1. The first vector in sequential order of 1 ($1 \le l \le N$) is represented with $b_1$.

The receiver 15 receives an input of target data to be processed from the input unit 13. The target data to be processed is image data in the first embodiment, but is not limited to this. Various types of data may be used including audio data, document data, and sensor data. Alternatively, the later-described second vector itself may be used.

The acquirer 17 acquires a second vector b (b∈B) that is an arbitrary vector existing in the d-dimensional binary space B and having a certain number d of components represented in binary, with either 0 or 1. In the first embodiment, the acquirer 17 acquires the second vector b by extracting the second vector b out of an image received, by the receiver 15.

For extracting the second vector out of image data, a known technique can be used for extracting a binary vector having components represented in binary, with either 0 or 1, out of image data. For example, results of a bit test in which the magnitude relation between two arbitrary pixels is represented with 0 and 1 may be used. Alternatively, a typical binary descriptor such as the binary robust independent elementary feature (BRIEF) descriptor and the oriented FAST and rotated BRIEF (ORB) descriptor may be used. Furthermore, the histograms of oriented gradients (HOG) (IJCV2004), for example, may be used in which the feature of continuous real numbers is calculated and then it is converted into a binary vector by using a method of locality sensitive hashing (LSH), for example.

In the first embodiment, a certain number N of first vector $b_1$ stored in the storage 11 are also extracted in advance in the same manner as the acquirer 17 does. The description is provided merely for exemplary purpose and not limiting.

The first calculator 19 extracts one or more first vectors $b_1$, out of a certain number N of first vectors $b_1$ stored in the storage 11, having the distance between a first vector b and the second vector b acquired by the acquirer 17, the distance satisfying a predetermined condition. The first calculator 19 then calculates the distribution of distance of one or more first vectors $b_1$ relative to the second vector b. The first calculator 19 can preferably extract two or more first vectors $b_1$, thereby calculating the distribution of distance of two or more first vectors $b_1$ relative to the second vector b. Examples of the predetermined condition includes the distance within a predetermined ratio or number in order of increasing value of the distance.

The first calculator 19 calculates, for example, values of the distance $h_1 = H(b, b_1)$ between the second vector b and a certain number N of first vectors $b_1$. The first calculator 19 then calculates the distribution of distance (the histogram) q(h) of the first vectors $b_1$ in the range of α% (0 <α<100) in order of increasing value of the distance $h_1$ (nearer to the second vector b).

Alternatively, the first calculator 19 may calculate values of the distance $h_1 = H(b, b_1)$ between the second vector b and a certain number N of first vectors $b_1$. The first calculator 19 may then calculate the distribution of distance q(h) of a certain M (M<N) number of first vectors $b_1$ in order of increasing value of the distance $h_1$ (nearer to the second vector b).

The Hamming distance between the second vector b and the first vector $b_1$ is represented with $H(b, b_1)$. Because both the second vector b and the first vector $b_1$ are d-dimensional binary vectors, the value of the distance $h_1$ is any integer value from 0 to d.

The generator 21 acquires a first kernel function determined depending on the distance between the second vector b acquired by the acquirer 17 and a certain number N of first vectors $b_1$ stored in the storage 11, for each distance in at least a part of the range of possible values of the distance therebetween. The generator 21 generates a second kernel function obtained based on the distribution of the distance calculated by the first calculator 19 and a plurality number of first kernel functions acquired as described above. The first kernel function is used for calculating the occurrence probability of the second vector b depending on the distance. The second kernel function is used for calculating the occurrence probability of the second vector b relative to the number N of first vectors $b_1$.

The generator 21 generates a second kernel function K(h) by using Equation (3), for example.

$$K(h) = \frac{1}{Z} \sum_{i=0}^{d} w(i) K_i(h) \qquad (3)$$

where i is a variable indicating the possible value of the distance between the second vector b and the number. N of first vectors $b_1$, which is any integer value from 0 to d, and Z is a normalization constant that makes the sum total 1 and is expressed by Equation (4), for example.

$$Z = \sum_{i=0}^{d} w(i) \qquad (4)$$

Returning to Equation (3), $K_i(h)$ is a first kernel function and expressed by Equation (5), for example.

$$K_i(h) = \frac{1}{Z_i} p_i^h (1 - p_i)^{d-h} \qquad (5)$$

In Equation (5), p in Equation (2) is $p_i$, which is divided by $Z_i$. It is noted that $p_i = i/d$, which has a parameter of the ratio of the distance relative to the number of dimensions d. Because $p_i = i/d$, decreasing the value of the distance i decreases the value of $p_i$ together with the degree of smoothing of the first kernel function $K_i(h)$, whereas increasing the value of the distance i increases the value of $p_i$ together with the degree of smoothing of the first kernel function $K_i(h)$. $Z_i$ is a normalization constant that makes the sum total 1 and is expressed by Equation (6), for example.

$$Z_i = \sum_{j=0}^{d} p_i^j (1 - p_i)^{d-j} \qquad (6)$$

Returning to Equation (3), w(i) indicates the weight of the first kernel function $K_i(h)$, which is determined based on the distribution of the distance q(h) calculated by the first calculator 19. The value in the histogram (frequency) of the distance i in q(h) may be represented with w(i), for example.

Alternatively, w(i) of the distance i, which is the representative value in q(h), may be determined to be 1, and w(i) of the distance i other than the representative value may be determined to be 0, for example. In this case, the first kernel function $K_i(h)$ of the distance i that is the representative value is the second kernel function K(h). Examples of the distance i that is the representative value are: the distance i having a value in the histogram that is the mean value, the distance i having a value in the histogram that is the median, the distance i having a value in the histogram that is the mode, and the distance i having the ratio of the sum of values in the histogram from the distance 0 to the distance i falling within the lowest p %.

Alternatively, w(i) of the distance i, which is the representative value in q(h), may be determined to be 1, and w(i) of the distance i other than the representative value in q(h) may be determined to gradually decrease as it is separated farther from the distance i, which is the representative value, for example.

As described above, the second kernel function K(h) can be a function obtained by dividing the sum total of the first kernel function $K_i(h)$ corresponding to the distance i to which the weight w(i) determined based on the distribution of the distance q(h) depending on the distance i for each distance i, by the sum total of the weight Z for each distance i.

If the second vector b is randomly generated, the expected value of the Hamming distance $H(b, b_1)$ between the second vector b and the first vector $b_1$ is d/2. Therefore, the first vector $b_1$ having the Hamming distance between itself and the second vector b larger than d/2 is hardly positioned in the vicinity of the second vector b. For this reason, Equation (3) may be modified as in Equation (7), and Equation (4) may be modified as in Equation (8).

$$K(h) = \frac{1}{Z} \sum_{i=0}^{[d/2]} w(i) K_i(h) \qquad (7)$$

$$Z = \sum_{i=0}^{[d/2]} w(i) \qquad (8)$$

In Equations (7) and (8), d in Equations (3) and (4) is modified to [d/2]. It is noted that [d/2] indicates the maximum integer not larger than d/2. In other words, in Equations (3) and (4), the certain range of the distance is determined to be equal to or smaller than d. As indicated in Equations (7) and (8), however, the certain range of the distance may be determined to have the maximum integer value not larger than d/2. Although the number of first kernel functions is d+1 at the maximum in Equation (3), the number of first kernel functions is [d/2]+1 in Equation (7).

If Equation (5) is used for the first kernel function $K_i(h)$, the calculation is likely to be influenced by "the curse of dimensionality" as the number of dimensions d increases. To address this problem, the number of dimensions d may be virtually reduced.

In this case, the generator 21 determines the number m of dimensions (m<d) after the above-described reduction in the number of dimensions. The generator 21 selects a certain number m of components from the second vector b and selects the number m of components from the first vector $b_1$, whereby the Hamming distance is calculated.

If a pair of vectors having the Hamming distance h in a d-dimensional binary space is observed in an m-dimensional binary space, the probability of the Hamming distance to be r is known to be hypergeometric distribution f(r; d, h, m), as indicated in Equation (9).

$$f(r; d, h, m) = \frac{\binom{h}{r}\binom{d-h}{m-r}}{\binom{d}{m}} \quad (9)$$

Accordingly, if a pair of vectors having the Hamming distance h in the d-dimensional binary space is observed in an m-dimensional binary space, the expected value $E_i(h)$ when estimating the probability by using the kernel smoothing is expressed by Equation (10).

$$E_i(h) = \sum_{r=0}^{h} f(r; d, h, m) p_i^r (1-p_1)^{m-r} \quad (10)$$

Subsequently, the generator 21 can use the function expressed by Equation (11), in which Equation (10) is normalized to be 1 by integrating with respect to [0, d], for a first kernel function.

$$K_i(h) = \frac{E_i(h)}{\sum_{j=0}^{d} E_i(h)} \quad (11)$$

If the function expressed by Equation (11) is used for the first kernel function, the expected value of the probability can be obtained by infinitely repeating the trial of virtually observing in the m-dimensional binary space a vector observed in the d-dimensional binary space and measuring the Hamming distance.

The second calculator 23 uses the second kernel function generated by the generator 21 to calculate the occurrence probability P(b) of the second vector b relative to the number N of first vectors $b_1$. For example, the second calculator 23 calculates the occurrence probability P(b) using Equation (12).

$$P(b) = \frac{1}{N} \sum_{i=1}^{N} K(h_i) \quad (12)$$

If the distribution of the distance (the histogram) s(h) of the number N of first vectors $b_1$ relative to the second vector b is already calculated, the second calculator 23 may use Equation (13) to calculate the occurrence probability P(b).

$$P(b) = \frac{1}{N} \sum_{h=0}^{d} s(h) K(h) \quad (13)$$

It is understood in advance that the value of the distance $h_1$ is any integer value from 0 to d, because both the second vector b and the first vector $b_1$ are d-dimensional binary vectors. If the values of the second kernel function are calculated in advance for all the possible values for the distance $h_1$ (any one of integer values from 0 to d), the inner product of each value of the second kernel function and the distribution of distance (the histogram) s(h) may be calculated as indicated in Equation (13), whereby the occurrence probability P(b) is calculated.

When calculating the occurrence probability P(b), if N, the number of first vector $b_1$ is larger than the number of dimensions d, Equation (13) is preferably used rather than Equation (12) to simplify the calculation on the occurrence probability P(b) and reduce the amount of computation.

The output controller 25 controls the output unit 27 to output the occurrence probability P(b) calculated by the second calculator 23.

Figure 4:
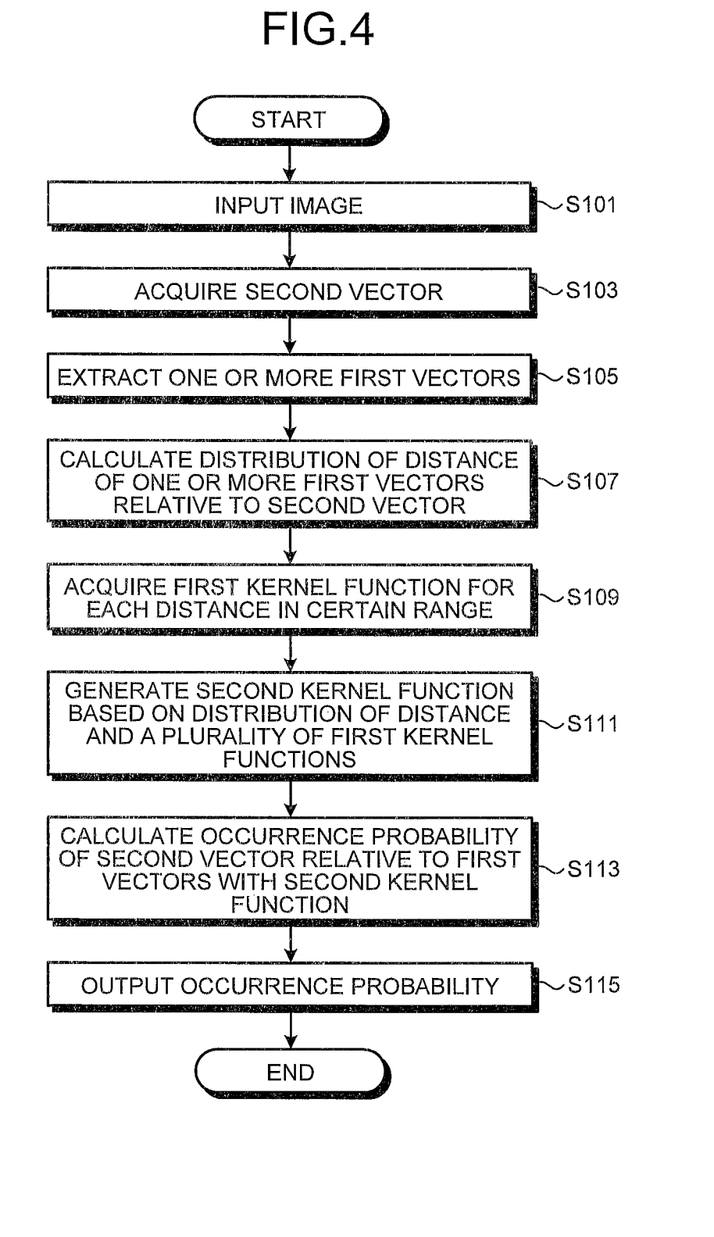
FIG. 4 is a flowchart illustrating a process according to a second embodiment.

FIG. 4 is a flowchart illustrating a process executed in the computing apparatus 10 according to the first embodiment.

Firstly, the receiver 15 receives an input of image data from the input unit 13 (Step. S101).

Subsequently, the acquirer 17 acquires the second vector b by extracting a second vector b out of the image received by the receiver 15 (Step S103).

Subsequently, the first calculator 19 extracts one or more first vectors $b_1$ having the distance between the first vector and the second vector b acquired by the acquirer 17, that satisfies a predetermined condition, out of the number N of first vectors $b_1$ stored in the storage 11 (Step S105). The first calculator 19 then calculates the distribution of the distance of one or more first vectors $b_1$ relative to the second vector b (Step S107).

Subsequently, the generator 21 acquires a first kernel function determined depending on the distance between the second vector b acquired by the acquirer 17 and the number N of first vectors $b_1$ stored in the storage 11, for each distance in at least a part of the range of possible values of the distance therebetween (Step S109). The generator 21 generates a second kernel function obtained based on the distribution of the distance calculated by the first calculator 19 and a plurality number of first kernel functions acquired as described above (Step S111).

Subsequently, the second calculator 23 uses the second kernel function generated by the generator 21 to calculate the occurrence probability P(b) of the second vector b relative to the number N of first vectors $b_1$ (Step S113).

Subsequently, the output controller 25 controls the output unit 27 to output the occurrence probability P(b) calculated by the second calculator 23 (Step S115).

As described above, according to the first embodiment, the second kernel function used for calculating the occurrence probability of the second vector b relative to the number N of first vectors $b_1$ is generated to calculate the occurrence probability by using the first kernel function having the degree of smoothing adaptively controlled, for each possible value of the distance between the second vector b and the number N of first vectors $b_1$. This achieves increased accuracy of calculation on the occurrence probability of the second vector b in the binary space.

Second embodiment

In a second embodiment, the following describes an example of calculating the occurrence probability of the second vector b for each category to which the first vector $b_1$ belongs, and identifying the category to which the second vector b belongs. The description below mainly describes the difference from the first embodiment. Common names and numerals are assigned to similar components to the first embodiment described above, and overlapping explanation thereof will be omitted.

Figure 5:
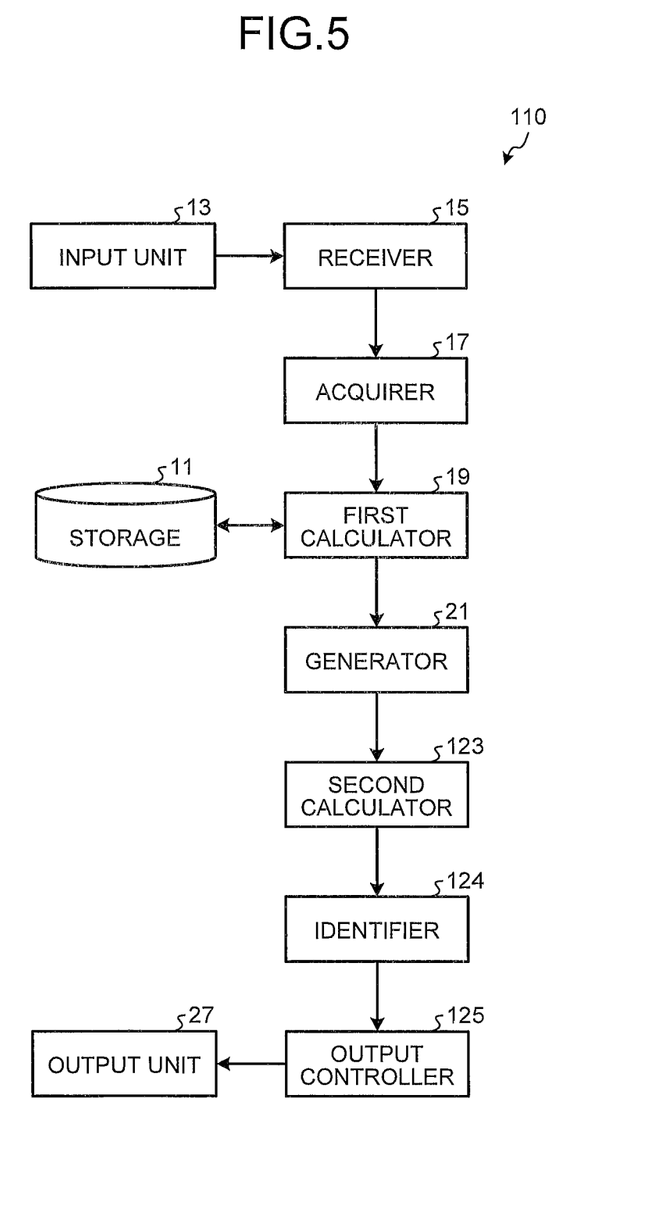
FIG. 5 is a configuration diagram illustrating a computing apparatus according to the second embodiment.

FIG. 5 is a configuration diagram illustrating a computing apparatus 110 according to the second embodiment. As illustrated in FIG. 5, the computing apparatus 110 according to the second embodiment includes the following different components from the first embodiment: a second calculator 123, an identifier 124, and an output controller 125.

In the second embodiment, the number N of first vectors $b_1$ stored in the storage 11 each belong to one of a certain number C (C≥2) of categories.

The second calculator 123 calculates the occurrence probability $P_c(b)$ of the second vector b relative to the first vector $b_1$ belonging to the category c by using the second kernel function generated by the generator 21, for each category c (1≤c≤C).

If the category to which the first vector $b_1$ belongs is $y_1$ ($y_1 \in \{1, \ldots, C\}$), the second calculator 123 calculates the occurrence probability $P_c(b)$ of the second vector b in the category c by using Equation (14).

$$P_c(b) = \frac{1}{n_c} \sum_{i \in D_c} K(h_i) \quad (14)$$

where $n_c$ indicates the number of elements of $D_c$ expressed by Equation (15), that is, the number of first vectors $b_1$ belonging to the category c. In addition, $D_c$ indicates the set of indices indicating the first vectors $b_1$ belonging to the category c.

$$D_c = \{i | 1 \leq i \leq N \hat{\ } y_i = c\} \quad (15)$$

Equation (14) can also be modified in the same manner as the modification from Equation (12) to Equation (13). In other words, if the distribution (the histogram) $s_c(h)$ of the distance $h_1$ in the category c is already calculated, the second calculator 123 may use Equation (16) to calculate the occurrence probability $P_c(b)$.

$$P_c(b) = \frac{1}{n_c} \sum_{h=0}^{d} S_c(h) K(h) \quad (16)$$

The identifier 124 identifies the category c to which the second vector b belongs based on the occurrence probability $P_c(b)$ for each category c calculated by the second calculator 123. The identifier 124 determines the second vector b to belong to the category c having the maximum value of the occurrence probability $P_c(b)$ out of the occurrence probability $P_c(b)$ for each category c, for example. However, the identifier 124 may determine the second vector b to belong to none of the categories c if the maximum value of the occurrence probability $P_c(b)$ is smaller than a threshold.

The output controller 125 controls the output unit 27 to output the identification result of the identifier 124. The identification result includes, for example, at least one of the category c identified by the identifier 124 and the occurrence probability $P_c(b)$ of the category c. The identification result may include the occurrence probability $P_c(b)$ for each category c, for example.

Figure 6:
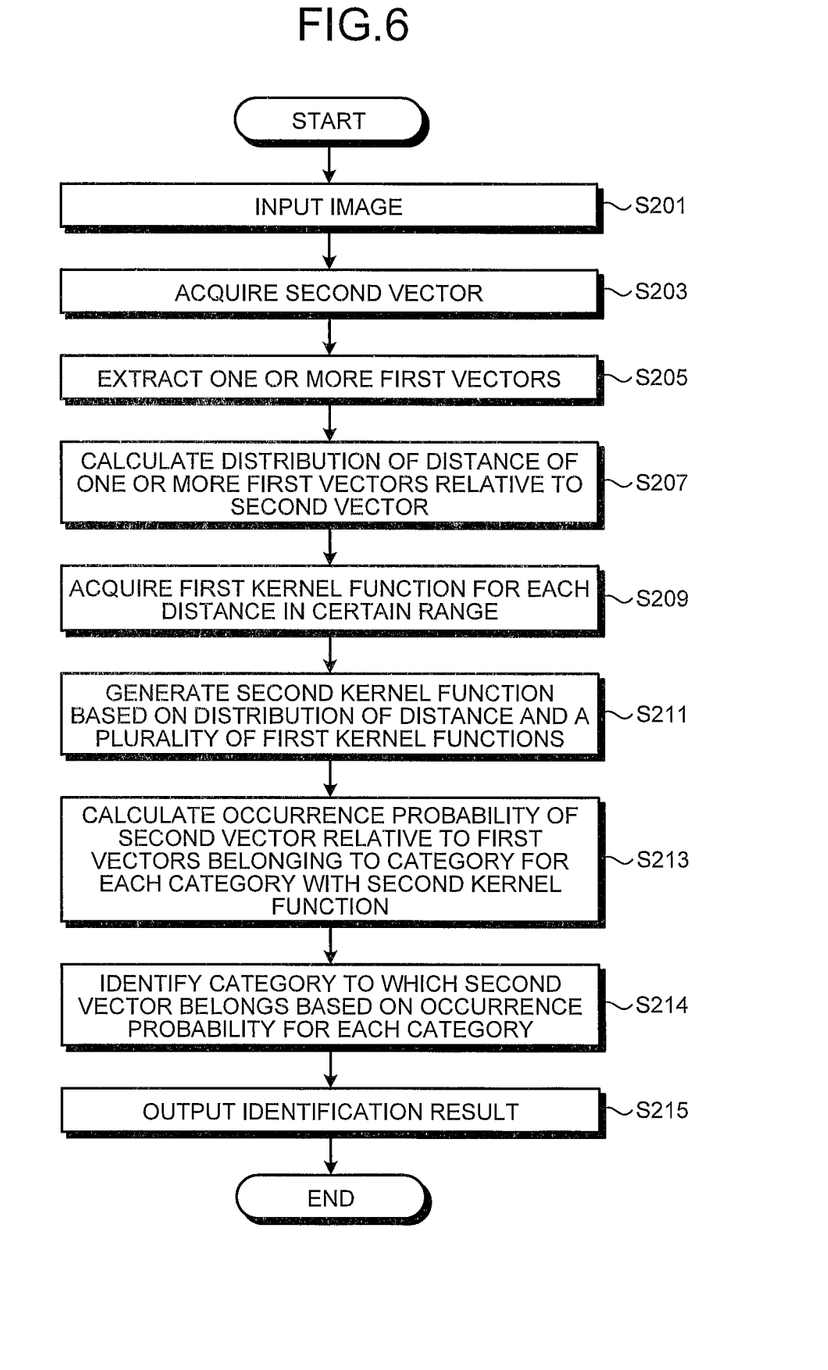
FIG. 6 is a flowchart illustrating a process according to the second embodiment.

FIG. 6 is a flowchart illustrating a process executed in the computing apparatus 110 according to the second embodiment.

The process from Steps S201 to S211 is similar to the process from Steps S101 to S111 illustrated in the flowchart in FIG. 4.

Subsequently, the second calculator 123 calculates the occurrence probability $P_c(b)$ of the second vector b relative to the first vector $b_1$ belonging to the category c by using the second kernel function generated by the generator 21, for each category c (Step S213).

The identifier 124 then identifies the category c to which the second vector b belongs based on the occurrence probability $P_c(b)$ for each category c calculated by the second calculator 123 (Step S214).

After that, the output controller 125 controls the output unit 27 to output the identification result of the identifier 124 (Step S215).

As described above, according to the second embodiment, increased accuracy of calculation is achieved on the occurrence probability of the second vector b in the binary space in the same manner as in the first embodiment. As a result, robust identification can be achieved due to the distribution difference among the first vectors $b_1$ in the vicinity of the second vector b.

The computing apparatus 110 can be applied to an identification device such as that for identifying a person (pedestrian) in an image captured by a vehicle-mounted camera, that for identifying a person from an image obtained by capturing the face of the person (facial recognition), and that for identifying the class of an object from an image obtained by capturing the object, for example, whether it is food (e.g., fruit? or vegetable? in detail), whether it is clothes (e.g., coat? or hat? in detail).

Consequently, the application of the computing apparatus 110 to the identification device as exemplified above enables the identification with higher accuracy.

Hardware Configuration

Figure 7:
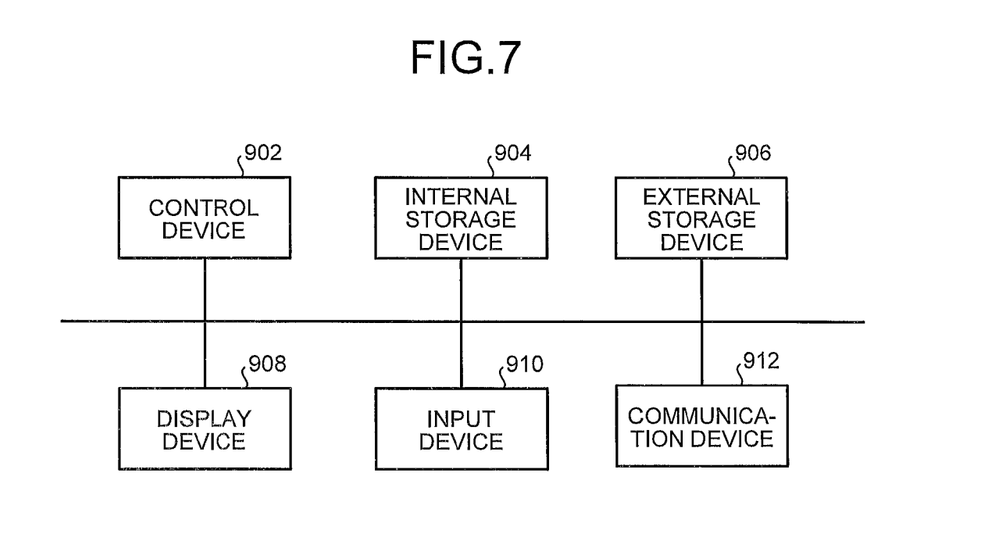
FIG. 7 is a block diagram illustrating the hardware configuration of the computing apparatus according to the above-described embodiments.

FIG. 7 is a block diagram illustrating the hardware configuration of the computing apparatus according to the above-described embodiments. As illustrated in FIG. 7, the computing apparatus according to the above-described embodiments includes: a control device 902 such as a CPU, an internal storage device 904 such as a ROM and a RAM, an external storage device 906 such as an HDD and an SSD, a display device 908 such as a display; an input device 910 such as a camera, and a communication device 912 such as a communication interface. The computing apparatus according to the above-described embodiments can be achieved with the hardware configuration in which a typical computer is employed.

The computer program executed in the computing apparatus according to the embodiments above is embedded and provided in a ROM in advance, for example.

The computer program executed in the computing apparatus according to the embodiments above may be recorded and provided in a computer-readable storage medium, which may be provided as a computer program product such as a compact disc read only memory (CD-ROM), a compact disc recordable (CD-R), a memory card, a digital versatile disc (DVD), and a flexible disk (FD), as an installable or executable file.

The computer program executed in the computing apparatus according to the embodiments above may be stored in a computer connected to a network such as the Internet and provided by being downloaded over the network. Furthermore, the computer program executed in the computing apparatus according to the embodiments above may be provided or distributed over a network such as the Internet.

The computer program executed in the computing apparatus according to the embodiments above has a module configuration for implementing the above-described components and units on a computer. In actual hardware, the control device 902 loads the computer program from the external storage device 906 onto the internal storage device 904 and executes the program. Once the program is executed, the above-described components and units are implemented on the computer.

As described above, according to the embodiments above, increased accuracy of calculation is achieved on the occurrence probability of an arbitrary vector in the binary space, in which values in the respective dimensions are represented in binary, with either 0 or 1.

The steps in the flowcharts according to the embodiments above may be modified in terms of the processing order, executed at the same time, or executed in different orders for each execution, for example, unless the modification or the execution is contrary to the characteristics of the steps.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computing apparatus comprising:
   a memory configured to store N first vectors in a d-dimensional binary vector space consisting of binary values(0 or 1), wherein each of the N first vectors is represented by d binary elements, wherein N is an integer equal to or larger than 2, and d is an integer equal to or larger than 1; and
   a processor configured to:
      acquire a second vector in the d-dimensional binary vector space, the second vector represented by d binary elements;
      extract M first vectors out of the N first vectors, M being an integer, larger than zero, and smaller than N, wherein respective distances between the M first vectors and the second vector satisfy a predetermined condition;
      calculate a distribution of the distances between the M first vectors and the second vector;
      acquire respective first kernel functions for the distances in a distance range, the distance range being at least a part of a possible distance range between the N first vectors and the second vector;
      generate a second kernel function based on the distribution and the first kernel functions; and
      calculate an occurrence probability of the second vector with respect to the N first vectors based on the second kernel function.

2. The computing apparatus according to claim 1, wherein the first kernel functions have respective ratios of the distances to the number of dimension d.

3. The computing apparatus according to claim 1, wherein the first kernel functions decrease respective degrees of smoothing as the distances decrease and increase the degrees of smoothing as the distances increase.

4. The computing apparatus according to claim 1, wherein the second kernel function is obtained by dividing a sum of the first kernel functions by a sum of respective weights for the distances, wherein the weights are determined based on the distribution.

5. The computing apparatus according to claim 4, wherein the weights are respective frequencies of the distances in the distribution.

6. The computing apparatus according to claim 1, wherein the predetermined condition is a condition that the distances fall within a ratio or number predetermined in ascending order of the distances.

7. The computing apparatus according to claim 1, wherein the distance range is determined to be equal to or smaller than d.

8. The computing apparatus according to claim 1, wherein the distance range is defined by a maximum integer value of distance not larger than d/2.

9. The computing apparatus according to claim 1, wherein the processor is further configured to output the occurrence probability.

10. The computing apparatus according to claim 1, wherein
    each of the N first vectors belongs to at least one of a plurality of categories, and
    the processor calculates the occurrence probability of the second vector with respect to first vectors belonging respectively to the categories based on the second kernel function.

11. The computing apparatus according to claim 10, wherein the processor is further configured to:
    identify a category to which the second vector belongs based on the occurrence probability for each of the categories; and
    output an identification result.

12. The computing apparatus according to claim 11, wherein the identification result includes the identified category and/or the occurrence probability of the category.

13. The computing apparatus according to claim 1, wherein the processor is further configured to receive image data, and acquire the second vector from the image data.

14. A computing method employed in a computing apparatus comprising:
    storing N of first vectors existing in a d-dimensional binary vector space consisting of binary values(0 or 1), wherein each of the N first vectors is represented by d binary elements, wherein N is an integer equal to or larger than 2, and d is an integer equal to or larger than 1;
    acquiring a second vector existing in the d-dimensional binary vector space, the second vector represented by d binary elements;
    extracting M first vectors out of the N first vectors, M being an integer, larger than zero, and smaller than N, wherein respective distances between the M first vectors and the second vector satisfy a predetermined condition;

calculating a distribution of distances between the M first vectors and the second vector;

acquiring respective first kernel functions for the distances in a distance range, the distance range being at least a part of a possible distance range between the N first vectors and the second vector;

generating a second kernel function based on the distribution and the first kernel functions; and calculating an occurrence probability of the second vector with respect to the N first vectors based on the second kernel function.

15. The computing method according to claim 14, wherein the first kernel functions have respective ratios of the distances to the number of dimension d.

16. The computing method according to claim 14, wherein the first kernel functions decrease respective degrees of smoothing as the distances decrease and increase the degrees of smoothing as the distances increase.

17. The computing method according to claim 14, wherein the second kernel function is obtained by dividing a sum of the first kernel functions by a sum of respective weights for the distances, wherein the weights are determined based on the distribution.

18. The computing method according to claim 17, wherein the weights are respective frequencies of the distances in the distribution.

19. The computing method according to claim 14, wherein the predetermined condition is a condition that the distances fall within a ratio or number predetermined in ascending order of the distances.

20. A computer program product comprising a non-transitory computer-readable medium containing a program executed by a computer, the program causing the computer to execute:

storing N first vectors existing in a d-dimensional binary vector space comprising binary values(0 or 1), wherein each of the N first vectors is represented by d binary elements, wherein N is an integer equal to or larger than 2, and d is an integer equal to or larger than 1;

acquiring a second vector existing in the d-dimensional binary vector space, the second vector represented by d binary elements;

extracting M first vectors out of the N first vectors, M being an integer, larger than zero, and smaller than N, wherein respective distances between the M first vectors and the second vector satisfy a predetermined condition;

calculating a distribution of distances between the M first vectors and the second vector;

acquiring respective first kernel functions for the distances in a distance range, the distance range being at least a part of a possible distance range between the N first vectors and the second vector;

generating a second kernel function based on the distribution and the first kernel functions; and calculating an occurrence probability of the second vector with respect to the N first vectors based on the second kernel function.

* * * * *